United States Patent [19]

Porcham

[11] 4,041,127

[45] Aug. 9, 1977

[54] METHOD OF TREATING THE FLUORINE-CONTAINING MUD PRODUCED BY THE ACID POLISHING OF LEAD GLASS SO AS TO FORM BASIC LEAD CARBONATE

[75] Inventor: Wolfgang Porcham, Hall in Tirol, Austria

[73] Assignee: D. Swarovski & Co., Wattens, Austria

[21] Appl. No.: 686,599

[22] Filed: May 14, 1976

[30] Foreign Application Priority Data

July 2, 1975 Germany .............................. 2529545

[51] Int. Cl.$^2$ .............................................. C01G 21/14
[52] U.S. Cl. ..................................... 423/92; 423/185; 423/433
[58] Field of Search ............... 423/395, 433, 333, 194, 423/185, 319, 92

[56] References Cited

U.S. PATENT DOCUMENTS

| | | | |
|---|---|---|---|
| 641,751 | 1/1900 | Steinhart et al. | 423/433 |
| 2,114,600 | 4/1938 | Larsson | 423/319 |

Primary Examiner—O. R. Vertiz
Assistant Examiner—Wayne A. Langel

[57] ABSTRACT

A process is disclosed for the production of lead carbonate by treatment of fluorine-containing mud produced in the polishing of lead glass with etching acid comprising:

a. separating said mud from the etching acid;
b. reacting the same with an aqueous alkali carbonate solution and filtering the solution;
c. dissolving the residue in nitric acid and precipitating the fluorides in the form of alkali hexafluorosilicates by the addition of alkali ions at a pH of the solution under 4 and filtering out the precipitate; and
d. adjusting the pH of the resulting solution to above 6.5 by the addition of alkali carbonate to the solution to precipitate basic lead carbonate.

4 Claims, No Drawings

METHOD OF TREATING THE FLUORINE-CONTAINING MUD PRODUCED BY THE ACID POLISHING OF LEAD GLASS SO AS TO FORM BASIC LEAD CARBONATE

BACKGROUND

The invention relates to a method of processing the fluorine-containing mud produced by the acid polishing of lead glass to form basic lead carbonate therefrom.

For the improvement of surface quality, and in part also for the attainment of desired dimensions within close tolerances, lead glass products are etched in accordance with known methods with a mixture of hydrofluoric acid and sulfuric acid. In this procedure the etching acid becomes increasingly contaminated with mud.

This mud must constantly be separated from the etching acid since otherwise it might be able to cover areas of the glass products and intefere with the action of the acid, causing an irregular ablation of glass resulting in polishing flaws.

Numerous methods and apparatus are known for the separation of the mud from the etching acid. Reference might be made, for example, to German Offenlegungsschriften Nos. 2,011,964 and 2,160,314 and German Auslegeschriften Nos. 1,920,009 and 2,162,815.

In the disclosures referred to above, the separation of the mud from the etching acid is described, and yet they say nothing about what can be done with the mud that is produced in large amounts.

The dumping of the mud is extremely problematical on account of its high acid content. Even if the mud is neutralized, as it is in some cases, it cannot be discarded without danger, since the soluble lead salts it contains can find their way into the ground water and thus constitute a considerable source of danger to man and animals.

A number of methods have become known which have to do with the transformation of lead compounds or mixtures.

In German Pat. No. 88,918 there is described a method of treating natural lead ores for the production of lead compounds. In this method the ores are transformed to lead sulfate with a solution containing sulfuric acid, and then further processed to lead carbonate.

German Pat. No. 886,301 discloses a process for producing a lead-rich double carbonate from substances containing lead sulfate, wherein the lead is removed by precipitation with sodium carbonate.

In German Pat. No. 936,506 there is described a process for the production of pure lead carbonate from wastes containing lead. Lastly, a process is described in German Pat. No. 940,291 for the production of pure, lead-containing intermediate or finished products, in which lead carbonate is dissolved in acids, such as nitric acid for example, in order to separate impurities.

The substances which are treated by the above-named, known processes have one thing in common, namely that they contain neither fluorides nor fluorosilicates. The polishing mud from lead glass etching contains, in addition to lead sulfate, a high proportion of about 20 to 60% alkali hexafluorosilicates, corresponding to a fluorine content of 12 to 36%. For this reason the known processes are not suitable for the treatment of polishing mud. By the known methods of procedure it is possible at most—and this only under very unsatisfactory circumstances —to obtain products which are greatly contaminated with fluorides and silica and therefore are not usable industrially.

THE INVENTION

The invention is addressed to the problem of devising a method for treating the mud produced in the acid polishing of lead glass whereby it will be possible to avoid the above-described dangers of environmental pollution and to process the mud into economically and industrially valuable products.

Surprisingly, it has been possible to devise a process whereby caustic and toxic etching mud can be treated in a very economical manner to yield a technically and economically valuable product, namely basic lead carbonate. This basic lead carbonate is suitable above all for the partial or complete replacement of minium or red lead in the production of lead glass. In addition, it can be further processed by known methods to yield lead-containing finished products, such as lead acetate, lead oxide and red lead.

The subject matter of the invention is a process for the treatment of the fluorine-containing mud produced in the acid polishing of lead glass to yield basic lead carbonate, said process being characterized in that the mud separated from the etching acid:

a. is reacted with an aqueous alkali carbonate solution and the solution is filtered,
b. then the residue is dissolved in nitric acid and the fluorides are precipitated in the form of alkali hexafluorosilicates by the addition of alkali ions at a pH below 4, and
c. the precipitate is filtered off and, by the addition of alkali carbonate to the solution, a pH above 6.5 is established in order to precipitate basic lead carbonate.

Preferably, the mud separated from the etching acid is washed with water and filtered prior to the reaction with an aqueous alkali carbonate solution (step a). In this manner acid contained in the mud is removed and the consumption of alkali carbonate in the reaction that follows is reduced.

It is furthermore advantageous to wash with water and filter the residue obtained after the reaction with an aqueous alkali carbonate solution, before dissolving it in nitric acid, in order thereby to reduce the fluoride content.

For the precipitation of the alkali hexafluorosilicates from the residue dissolved in nitric acid it is advantageous to add silicic acid to the solution, in addition to the alkali ions.

The composition of the mud produced by the acid polishing process depends on the composition of the lead glass. The main components are lead sulfate and alkali hexafluorosilicate. In addition, the mud may also contain barium sulfate and calcium sulfate and, in the case of lead glasses of greater boric acid content, small amounts of potassium tetrafluoroborate. The composition of the etching muds can range within the limits stated herewith:

Mud Composition (wt.-%)

$PbSO_4$—15 to 70
$K_2SiF_6$—20 to 50
$Na_2SiF_6$—10 to 25
$BaSO_4$—0 to 10
$CaSO_4$—0 to 3
$KBF_4$—0 to 3

Etch muds commonly contain 40 to 50 wt.-% of $PbSO_4$, 30 to 38 wt.-% of $K_2SiF_6$ and 16 to 20 wt.-% of $Na_2SiF_6$.

The acid polishing of lead crystal (high-quality tableware and chandelier glass, PbO content at least 24 wt.-%) and of high-lead crystal (high-quality tableware and chandelier glass, PbO content at least 30 wt.-%) is of the greatest industrial importance.

A typical example of a mud from high-lead crystal polishing is a mud of the following composition:
$PbSO_4$—46.2 wt.-%
$K_2SiF_6$—34.8 wt.-%
$NA_2SiF_6$—18.6 wt.-%
Mud density: 3.68 g/cm³
Color: white In the process of the invention, the mud separated from the etching acid is first suspended in an alkali carbonate solution, whereupon the lead sulfate is transformed to lead carbonate and hexafluorosilicate is hydrolyzed, as follows:

$$PbSO_4 + CO_3^{2-} \rightarrow PbCO_3 + SO_4^{2-} \quad (1)$$

$$Me_2^I SiF_6 + 6\,OH^- \rightarrow SiO_3^{2-} + 6\,F^- + 2\,Me^+ + 3\,H_2O \quad Me^I = Na, K \quad (2)$$
$$SiO_3^{2-} + (x+1)H_2O \rightleftharpoons SiO_2 \cdot x\,H_2O + 2\,OH^- \quad (3)$$

After completion of the reaction, the suspension is filtered and a residue is obtained consisting of lead carbonate, alkali flouride and silica in addition to adsorbed fluorides and sulfates.

The residue obtained is dissolved in nitric acid. By the addition of alkali ions, such as potassium ions for example, fluoride and silica can now be precipitated together from the nitric acid solution in the form of sparingly soluble alkali hexafluorosilicates;

$$SiO_2 \cdot x\,H_2O + 6\,F^- + 2\,K^+ + 4\,H^+ \rightarrow K_2SiF_6 + (x+2)H_2O \quad (4)$$

The alkali hexafluorosilicates are filtered out. The filtrate is essentially a nitric acid solution of lead nitrate. By the addition of sodium carbonate to produce a pH higher than 6.5, basic lead carbonate is precipitated from the nitric acid solution of lead nitrate. This product is filtered out, washed and dried.

The process of the invention will be further explained herewith:

The polishing mud is separated from the etching acid by means of an appropriate separating apparatus such as a filter press, for example. The etching acid usually consists of a mixture of sulfuric acid, hydrofluoric acid and water. The methods and apparatus described in the disclosures specified above can be used for the separation of the mud from the etching acid. Preferably, the parts of the apparatus which come in contact with the etching acid and the mud, such as the filter press for example, consist of a corrosion-resistant material, such as a plastic—polypropylene, for example. The etching acid freed of the mud is reused for the acid polishing process. The mud is treated to yield basic lead carbonate which, if desired, can be further processed to make other lead-containing products.

It is advantageous to wash the separated mud with water and filter it again to remove acid from it. This will reduce the alkali carbonate consumption in the reaction that follows.

The mud is then thoroughly mixed with alkali carbonate and water in a suitable apparatus. Sodium carbonate is preferred as the alkali carbonate, since it is the cheapest. An example of a suitable apparatus is a corrosion-resistant vessel equipped with a stirrer. If the basic lead carbonate that is finally obtained is to be used in the manufacture of glass, an especially low iron content in the product is desired. Consequently, corrosion-resistant, iron-free materials are preferred as materials for the vessel or for the lining thereof, such as for example plastics such as polypropylene.

The mud-to-water ratio for mixing amounts to from 1.25 to 1:2.5, and is preferably about 1:5 wt.-parts. The amount of sodium carbonate to be added is selected such that, upon completion of the reaction, a pH value between 7.5 and 12.0 will be reached, preferably one between 8.0 and 9.0. The reaction temperature is not critical and can be between room temperature and boiling temperature. However, elevated temperature accelerates the reaction. The reaction will be complete within one-half to three hours, depending on the temperature and the intensity of the mixing action.

Then the solid phase is separated from the fluid phase in a suitable apparatus, such as a filter press, for example, as described above. The residue is then preferably washed with water and filtered in order further to reduce the fluoride content. This washing, however, can be omitted.

The residue thus obtained is then suspended in water in a suitable apparatus, such as a vessel equipped with a stirrer, as described above. Water is usually added to the residue in a ratio of 1:15 to 1:2.5 parts by weight. Nitric acid is added slowly to the suspension, with stirring, until a pH value of less than 4, preferably between 0 and 3, and especially 1, is established, whereupon the mixture will become heated to as high as the boiling temperature, depending on the temperature and amount of the water added. Alkali ions are then added to the hot solution. Preferably, 3 to 25 kg of potassium nitrate of 2 to 17 kg of potassium carbonate will be added per 100 kg of residue. If potassium carbonate is used, care must be taken to see that the pH value of the suspension is not greater than 4, and is preferably approximately 2. In some cases additional nitric acid must be put into it.

In order to separate the fluoride ions to the greatest possible extent, another 1 to 10 kilograms of silica is preferably added to the hot suspension, in the form, for example, of quartz flour such as is used in glass-making, for every 100 kilograms of residue.

The mixture is then allowed to cool to room temperature with stirring, and the solid phase is separated from the liquid phase in a suitable apparatus, such as a filter press, as described above. The liquid phase obtained is a solution of lead nitrate in nitric acid, with a fluoride content of less than 0.08 wt.-%, if the filtering has been performed at temperatures equal to or lower than 20° C.

If sodium salts (2.5 to 21 kg of sodium nitrate or 1.5 to 13 kg of sodium carbonate) are used instead of the more expensive potassium salts, a lead nitrate solution is obtained having a fluoride content of less than 0.4 wt.-% if the filtering has been performed at temperatures equal to or lower than 20° C. The basic lead carbonate which is obtained as the end product will thus have a slightly higher fluoride content if sodium salts are used than if potassium salts are used.

Then, in a suitable apparatus, such as a vessel equipped with a stirrer as described above, basic lead carbonate is precipitated by the portion-wise addition of alkali carbonate, preferably sodium carbonate, until a pH greater than 6.5 is reached. The lead carbonate is separated in a suitable apparatus, such as a filter press, and is washed with water. Then the product is dried, in conventional drying ovens for example, at temperatures between 120° and 150° C.

By the process of the invention, basic lead carbonate is obtained having the following specification:
 Color: white
 Density: greater than 6.0
 PbO: More than 80 wt.-%
 F: less than 0.15 wt.-%

The product is suitable above all for direct use in lead glass production for the partial or complete replacement of minium. Test melts in which all of the minium was replaced by basic lead carbonate were of perfect quality. The basic lead carbonate can furthermore be transformed by known methods to other lead-containing products, such as lead acetate, lead oxide, minium, lead cyanamide, lead chromates and the like (cf., for example, *Ullmanns Encyklopadie der technischen Chemie*, third edition 1962, Verlag Urban und Schwarzenberg, Munich - Berlin; pp. 784 sqq., and German Pat. No. 940,291).

By the process of the invention, therefore, not only is the problem of environmental pollution by mud produced in the acid polishing of lead glass solved, but also the possibility is created for manufacturing valuable products in an economical manner from this caustic and toxic waste.

The invention will now be explained with the aid of an example.

EXAMPLE 140 kg of mud from a high-lead crystal etching operation, having a content of 46.2 wt.-% $PbSO_4$, 34.8 wt.-% $K_2SiF_6$ and 18.6 wt.-% $Na_2SiF_6$, was suspended in 700 liters of water of a temperature of about 70° C in a polypropylene-lined 1000-liter tank equipped with a controlled stirrer, and 119 kg of sodium carbonate was added. The mixture was stirred for one hour. Then it had a pH of 8.6 and a temperature of approximately 35° C. The solid phase was filtered out in a filter press in which the parts coming in contact with the product were made of polypropylene.

The solid phase was again placed in the tank with the stirrer and suspended in 500 liters of cold water. With the stirrer running, 40 liters of nitric acid having a density of 1.40 and 7 kg of quartz flour plus 9 kg of sodium carbonate were added. After about one hour of stirring, the mixture had cooled down to room temperature and a pH of 2 had established itself. The solid phase was filtered out in a filter press and the liquid phase was pumped back into the tank.

14 kg of sodium carbonate was added to the liquid phase with stirring and a pH of 7.4 was established. The precipitated basic lead carbonate was filtered out in the filter press, washed, and dried at 130° C.

A white, basic lead carbonate having a density of 6.1 was obtained in a yield of 54.6 kg. The PbO content was 83.8%, i.e., 96% of the theory. The fluorine contact amounted to only 0.1%.

I claim:

1. A process for the production of lead carbonate by treatment of fluorine-containing mud produced in the polishing of lead glass with etching acid said mud being substantially of the following composition by weight:
 $PbSO_4$—15 to 70
 $K_2SiF_6$—20 to 50
 $Na_2SiF_6$—10 to 25
 $BaSO_4$—0 to 10
 $CaSO_4$—0 to 3
 $KBF_4$—0 to 3
and comprising the steps of:
 a. separating said mud from the etching acid;
 b. reacting the same with an aqueous alkali carbonate solution and filtering the solution;
 c. dissolving the residue in nitric acid and precipitating the fluorides in the form of alkali hexafluorosilicates by the addition of a compound providing a source of alkali ions at a pH of the solution under 4 and filtering out the precipitate; and
 d. adjusting the pH of the resulting solution to above 6.5 by the addition of alkali carbonate to the solution to precipitate basic lead carbonate.

2. A process according to claim 1, wherein the mud separated from the etching acid is washed with water and filtered prior to the reaction with an aqueous solution of alkali carbonate.

3. A process according to claim 1, wherein the residue is washed with water and filtered before it is dissolved in nitric acid.

4. A process according to claim 1, wherein silica is added to the residue dissolved in nitric acid, in addition to the alkali ions.

* * * * *